Aug. 26, 1952  P. L. HEITMEYER ET AL  2,608,192
RETRACTOR
Filed June 21, 1948
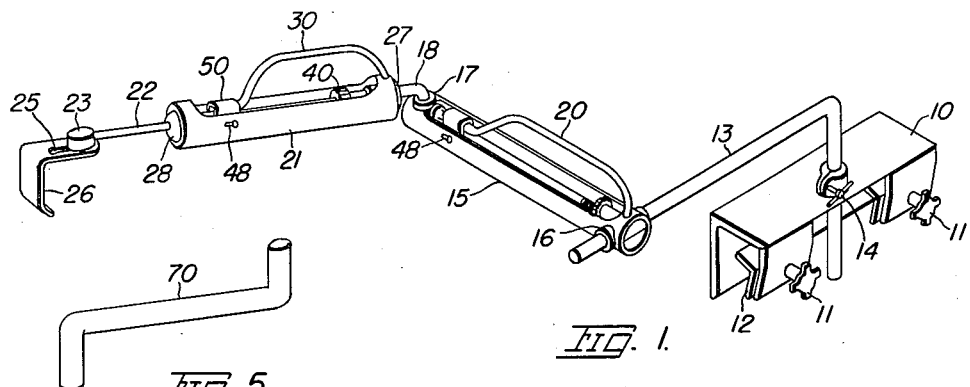
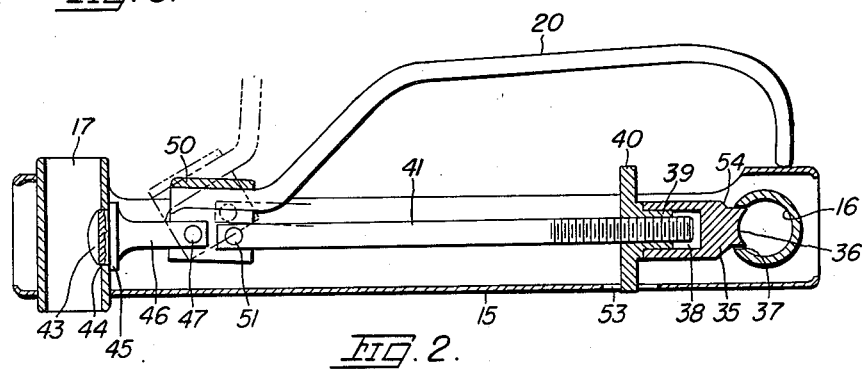
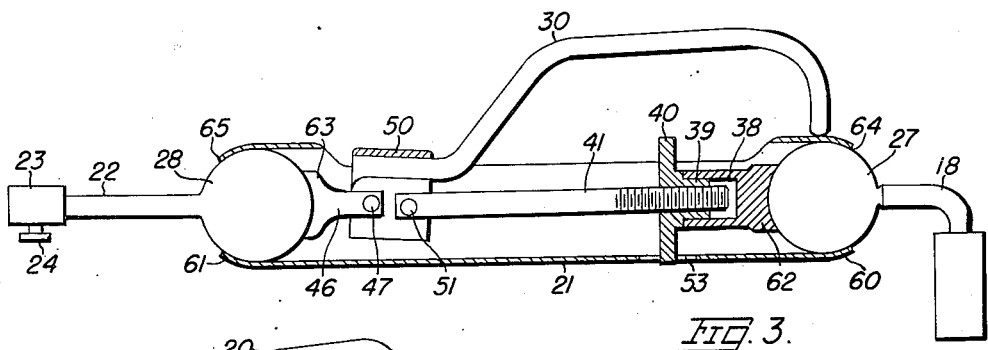
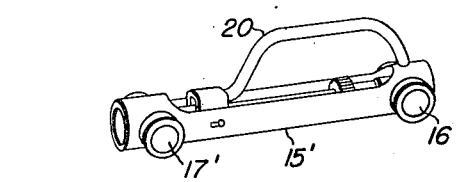
INVENTORS
POWIS L. HEITMEYER
HARVEY A. LEISY
BY
Cook and Schermerhorn
ATTORNEYS Patented Aug. 26, 1952

2,608,192

UNITED STATES PATENT OFFICE 2,608,192

RETRACTOR

Powis L. Heitmeyer and Harvey A. Leisy,
Portland, Oreg.

Application June 21, 1948, Serial No. 34,268

6 Claims. (Cl. 128—20)

This invention relates to a retractor for use on an operating table and the like, and includes as a part of such retractor clamping devices which may be of general application.

When a surgeon performs an operation, it has heretofore been the practice to have a number of assistants to hold body tissues and the like out of the way to provide access to the parts requiring attention. The general object of the present invention is to provide a mechanical retractor which may be clamped in a set position to perform the function of an assistant without occupying as much space around the operating table and allowing only controlled movement of the parts being held or secured. When a number of human assistants must be used for this purpose, they are necessarily in the way of the surgeon and his other assistants who must be present to take care of instruments and other duties which require, in any event, at least one or two human assistants. Holding a retractor motionless under considerable tension is a very tiresome task, and one which can be performed much more satisfactorily by a mechanical device, provided the device is properly designed to be effective for its purpose.

Further objects of the present invention are, therefore, to provide a mechanical retractor which is jointed to simulate or to perform the articulating action of the human arm and hand, and which may be clamped securely and untiringly in a fixed position to hold a retractor blade immovable during an operation. More specific objects are to provide a retractor for the purpose described having a mechanical arm including certain arm members with novel and powerful clamping means for binding and securing the various joints in the arm with a minimum of levers and adjustable parts, and to provide a novel arm member in the form of a clamping device having a single clamping lever to clamp associated members at either end thereof rigidly in fixed positions by a simple manipulation.

Important features of the invention comprise the construction of individual clamping devices which constitute certain of the arm members of the retractor. Each of the clamping devices is made in the form of an elongated body having bearing means at its ends designed for pivotal connection with cylindrical or spherical ends on other of the arm members. The body member of each clamping device contains oppositely disposed clamping elements which may be extended into clamping engagement with such members in the bearing elements by a sliding toggle action through the manipulation of a single over-center clamping and locking lever by which the device may be either clamped or released with a simple movement of such lever.

The invention will be better understood and additional objects and advantages will become apparent as the description proceeds in connection with the accompanying drawing illustrating the salient features of the invention. It is to be understood, however, that the drawing is merely for the purpose of illustration and not for the purpose of limiting the invention. Various changes may be made in the construction and arrangement of parts, and all such modifications within the scope of the appended claims are included in the invention.

In the drawings:

Figure 1 is a perspective view of one form of retractor embodying the principles of the invention;

Figure 2 is a sectional view showing the construction of one of the clamping devices illustrated in Figure 1;

Figure 3 is a sectional view showing the construction of another of the clamping devices illustrated in Figure 1;

Figure 4 is a perspective view of a modified form of clamping device; and

Figure 5 is a perspective view of a link or arm to be used with the clamping devices.

Referring first to the complete retractor arm shown in Figure 1, the numeral 10 designates a supporting clamp to mount the retractor arm on a longitudinal rail extending along the side of the operating table. Hand screws 11 provide for clamping a pair of angle iron shoes 12 into secure engagement with the supporting rail. When the hand screws 11 are loosened, the clamp 10 may be moved along the rail without rotating on the rail. An angular supporting bar 13 having horizontal and vertical arms of circular cross section is secured in the clamp 10 in adjusted position by means of a clamp screw 14.

One of the articulating arm members of the retractor comprises a clamping member 15 having an open sided tubular body with a cylindrical bearing 16 in one end thereof to receive the bar 13. The other end of the member 15 is provided with a similar bearing 17 to receive the downturned end of an L-shaped arm or link 18, the bearings 16 and 17 being disposed at right angles to each other, with the bearing 16 horizontal and the bearing 17 vertical in the illustrative embodiment. Both of these bearings include clamping elements to engage the respective arms 13 and 18 with sufficient force to prevent relative movement of the parts and both of the clamping elements may be engaged or released simultaneously by a single manipulative handle 20. When the clamping elements are released by the handle 20, the arms 13 and 18 may have both longitudinal and pivotal movements in their respective bearings for adjustment of the relative positions of the parts.

Another articulating arm member of the retractor comprises a clamping member 21 connected with the arm 18 at one end and with an arm 22 at its other end. In the present embodiment the extremity of the arm 22 carries a head 23 having a headed stud 24 to engage in a keyhole slot 25 of a detachable retractor blade 26. The arms 18 and 22 have ball ends 27 and 28, respectively, mounted in the opposite ends of the member 21 for swiveling and universal movements. Clamping elements are provided in the member 21 to clamp the ball ends 27 and 28 in adjusted position simultaneously by the simple manipulation of a single handle 30. Thus, the ball ends 27 and 28 provide universal movement which, in conjunction with the pivotal and longitudinal movements provided by the previously mentioned bearings 16 and 17 in the clamping member 15, allow the retractor blade 26 to be placed in any desired position to perform the service of an assistant at the operating table to hold various tissues, clamps or instruments away from the region of the operation.

The mechanical construction of the clamping member 15 is shown in Figure 2. The clamping element associated with the bearing 16 comprises a clamping shoe 35 having an arcuate cylindrical surface 36 which may be projected through an opening 37 in the bearing to engage any shaft or rod that may be disposed therein such as the horizontal cylindrical arm of the bar 13. The clamping shoe 35 extends longitudinally within the elongated tubular body of the member 15, and has a cylindrical bore 38 to receive loosely a hub 39 on a nut 40 arranged to bear against the clamping shoe. The nut 40 is mounted on the threaded end of a push rod 41 extending longitudinally through the open interior of the hollow body 15 whereby a force applied to the push rod is transmitted to the clamping shoe.

The clamping element associated with the bearing 17 comprises a similar arcuate shoe 43 arranged to project through an opening 44 in the side of the bearing as shown. A flange 45 limits the distance which the shoe 43 may be projected into the bearing, and both the shoe and flange are preferably formed as integral parts on the end of a push rod 46 extending toward the end of the push rod 41.

The end of the push rod 46 remote from the clamping shoe is apertured to receive a pin 47 whose opposite ends extend into engagement with the opposite sides of the body of the member 15. The ends of the pin 47 are received in longitudinal slots 48 (Figure 1) to permit longitudinal movement of the push rod 46 while holding it in alignment with the center of the opening 44. A U-shaped toggle lever 50 is apertured for mounting on the pin 47 with the ends of the two push rods 41 and 46 included between its two arms. The end of the push rod 41 is apertured to receive a pin 51 which is mounted at its ends in the two arms of the U-shaped toggle lever 50. The pin 51 does not extend out to engage the slot 48 or any part of the body of member 15. The handle 20 is attached to the toggle lever 50.

The action of the above described clamping arrangement is such that when the handle 20 is closed into its full line position in Figure 2, the pin 51 is carried over center and slightly below the pin 47 by the time the free end of the handle engages the body member 15. The nut 40 exposed on the upper side of the body member and projecting through an opening 53 in its lower side provides convenient means of adjustment to shorten or lengthen the effective length of push rod 41, so that the clamping shoes 35 and 43 will then be projected through their respective openings 37 and 44 into firm clamping engagement with whatever cylindrical members or rods may be inserted in the two bearings 16 and 17. The over-center movement of the pin 51 with respect to the pin 47 holds the parts locked in clamped position when there are members in the bearings 16 and 17 for the clamping shoes to engage. When the arm 20 is raised to its broken line position it will be apparent that the push rod 41 is slightly retracted by the arcuate movement of the pin 51 about the pin 47 as a center. This movement will release not only the clamping shoe 35, but also the clamping shoe 43, inasmuch as the pin 47 is free to move in the slots 48 which support it, permitting the two push rods and toggle lever 50 to float longitudinally as a unit. Only a very slight relative longitudinal movement between the two push rods 41 and 46 is necessary to clamp or release the device. Shoulders 54 prevent the shoe 35 from projecting too far into its bearing opening so that the parts cannot become dislocated when no shaft is present in the bearing.

To facilitate assembly and disassembly of the parts, the slots 48 are preferably made as keyhole slots having a wide end to receive the pin 47 in assembly of the device and narrow portions to receive flattened ends on the pin 47 for sliding movement when the parts are assembled in adjusted position. The construction is such that the parts may be easily disassembled for cleaning, but cannot become accidentally disassembled through ordinary adjustment. The adjustability provided by the nut 40 allows the clamping force to be varied to any value desired. The clamping force may be adjusted to such a small value that the arm members of the retractor will turn under their own weight, or, if desired, the joints may be made so tight that it is physically impossible to move them. In either extreme of adjustment the mechanical advantage of the toggle lever 50 is such that the hand lever 20 is easily manipulated and reliably self-locking, and the slots 48 permit the whole toggle linkage to slide longitudinally to equalize the force exerted on the two clamping shoes.

The construction of the clamping member 21 is shown in Figure 3. This device operates on the same principle and has the same general construction as the device shown in Figure 2, and like parts and features are designated by the same reference numerals. The clamping member 21, however, is different from the clamping member 15 in two important respects. The first difference is that the pivotal action provided by the member is not merely rotary, but one of swiveling and universal movement at each end of the member. The second difference resides in the fact that the arms with which the member 21 is connected are not removable from the body of the member. The ball ends 27 and 28 are retained in spherical bearings 60 and 61, respectively, and are not adapted to be removed except by disassembling the device. The clamping elements in this case comprise shoes 62 and 63 having spherically curved seats to fit the surfaces of balls 27 and 28. When the handle 30 is raised to release position, the push rods 41 and 46 are retracted slightly toward each other so that the balls are free to rotate or twist in any direction within the limits of circular openings 64 and 65 in the ends of the body. When the handle 30 is closed down to engage the body member, as shown in Figure 3, the pin 51 is moved to an over-center position with respect to pin 47, causing the push rods 41 and 46 to be relatively extended away from each other a sufficient amount to engage the clamping shoes 62 and 63 with their respective balls. As in the clamping member 15, the nut 40 provides a wide range of adjustment to make the clamping action as tight or as loose as desired, the clamping action of the sliding toggle exerting the same force against each ball. The amount of longitudinal movement of the push rods 41 and 46 is so slight in the clamping and unclamping actions that the clamping shoes 62 and 63 cannot become displaced from their natural self-centered positions against the balls.

Thus the use of the two clamping members 15 and 21 shown in Figure 1 provides a very flexible retractor having four movable joints, allowing the retractor blade 26 to be placed in any desired position, which position may be readily maintained by merely snapping down the two handles 20 and 30. Two or more of the complete retractor arms shown in Figure 1 may be used, as desired. In retractors heretofore proposed, it has been necessary to adjust and tighten each joint separately by its own individual clamping device, making the retractor cumbersome and awkward to manipulate and of doubtful advantage. An assisting apparatus of the present type which will tend to reduce the strain on the operating surgeon and shorten the actual time of the operation is of great benefit, both to the surgeon and the patient.

Figure 4 shows a clamping member 15' similar to the clamping member 15, except that the bearing 17' is oriented in parallel relation with the bearing 16. It is apparent that by the use of suitable connecting arms the member 15' may be substituted for either of the members 15 or 21 in Figure 1, or may even be interposed between certain of the members shown in Figure 1 to provide additional joints in the retractor. For some purposes the member 15' may be more convenient than the member 15.

Figure 5 shows an arm 70 of crank shape comprising a bent cylindrical rod which may be used to advantage with either of the clamping members 15 or 15' to provide an off-set articulating movement. It is also within the scope of the invention to use a pair of arms somewhat similar to the arm 70 in the two bearings of the clamping member 15' to form an independent retractor which would be supported solely by the patient without the use of supporting clamp 10 and arm 13. Two arms 70 mounted in the bearings 16 and 17' of the clamping member 15' could then be swung toward or away from each other and clamped in a set position to hold apart muscles or tissue under an incision. For such use, the arms may, of course, be provided with detachable retractors, such as the retractor 26 in Figure 1, if desired.

Other equivalent forms of mechanical construction will occur to persons skilled in the art, and other arrangements for connecting the parts together for different purposes will occur to persons familiar with the problems of surgery, and it is intended that the invention shall include all such modifications and adaptations to various purposes. The apparatus disclosed is not necessarily limited to surgical use, but may be adapted in whole or in part to many different uses to provide an adjustable supporting or holding device.

Having now described our invention and in what manner the same may be used, what we claim as new and desire to protect by Letters Patent is:

1. A clamping device for pivotal connection between a pair of arm members in a jointed supporting arm, comprising an elongated body member, bearing means for pivotal connection of the respective arm members in opposite ends of said body member, individual clamping elements in said body member having opposed longitudinal movement into clamping relation with said bearing means, a toggle joint connection between said clamping elements for effecting said opposed movement, and a pivot pin in said toggle joint having longitudinal sliding engagement with said body member to accommodate sliding movement of said toggle joint connection and both clamping elements as a unit for equalizing the clamping forces exerted by the clamping elements.

2. A clamping device for pivotal connection between a pair of arm members in a jointed supporting arm, comprising an elongated body member, bearing means for pivotal connection of the respective arm members in opposite ends of said body member, individual clamping elements having opposed longitudinal movement toward said bearing means in the respective ends of said body member, a toggle joint connection between said clamping elements for effecting said opposed movement to move said clamping elements into clamping relation with the respective bearing means, longitudinal guide means in said body member, and a pin in said toggle joint having end portions engaging said guide means for longitudinal movement of the toggle joint and clamping elements in unison to equalize the clamping force of the two clamping elements.

3. In a jointed supporting arm having a plurality of pivotally connected arm members, an elongated tubular shell forming one of said arm members, bearing means in opposite ends of said shell for pivotal connection with other members of said arm, a pair of clamping elements in said shell having opposed longitudinal movement into clamping relation with said bearing means, a toggle member pivotally connected between said clamping elements, a hand lever integral with said toggle member for thrusting said clamping elements apart in said opposed longitudinal movement, longitudinal slots in said shell, and a pivot pin in said toggle member having end portions engaging said slots for longitudinal movement of the toggle member and clamping elements in unison to equalize the clamping force of the two clamping elements.

4. A clamping device for pivotal connection between a pair of members in a jointed supporting arm, comprising an elongated body member, bearing means for pivotal connection of the respective members in opposite ends of said body member, individual clamping elements in said body member having opposed longitudinal movement into clamping relation with said bearing means, a toggle joint connection between said clamping elements having an over-center movement to clamp and unclamp said elements, said toggle joint and clamping elements being movable longitudinally as a unit relative to said body member to equalize the clamping force of the two clamping elements, and a length adjustment on one of said clamping elements to adjust the clamping force of both clamping elements.

5. A clamping device for pivotal connection between a pair of members in a jointed supporting arm, comprising an elongated body member, bearing means for pivotal connection of the respective members in opposite ends of said body member, individual clamping elements in said body member having opposed longitudinal movement into clamping relation with the respective bearing means, a toggle element having pivotal connections with said two clamping elements, guide means on one of said elements having longitudinal sliding engagement with said body member to accommodate sliding movement of said toggle element and both clamping elements as a unit for equalizing the clamping forces exerted by the clamping elements, a hand lever on said toggle element for imparting an over-center movement to said toggle element to clamp and unclamp said clamping elements, and means for adjusting the position of one of said clamping elements relative to its associated bearing means to adjust the clamping force of both clamping elements.

6. An articulated retractor arm comprising a series of arm members pivotally connected together in end to end relation, a supporting clamp on one end of said retractor arm, and a retractor blade on the other end of said retractor arm, at least one of said arm members comprising an elongated body member having bearing means in its opposite ends for pivotal connection with other of said arm members, individual clamping elements in said body member having opposed longitudinal movement into clamping relation with said bearing means, a toggle joint connection between said clamping elements having an over-center movement to clamp and unclamp said elements, said toggle joint and clamping elements being movable longitudinally as a unit relative to said body member to equalize the clamping force of the two clamping elements, and a length adjustment on one of said clamping elements to adjust the clamping force of both clamping elements.

POWIS L. HETTMEYER.
HARVEY A. LEISY.

REFERENCES CITED

The following references are of record in the file of this patent:

UNITED STATES PATENTS

| Number | Name | Date |
|---|---|---|
| 1,054,488 | Bailey | Feb. 25, 1913 |
| 1,306,426 | Graves | June 10, 1919 |
| 1,440,401 | May | Jan. 2, 1923 |
| 1,747,799 | Straus | Feb. 18, 1930 |
| 2,238,869 | Haynes | Apr. 15, 1941 |
| 2,245,252 | Cleghorn | June 10, 1941 |
| 2,346,346 | Anderson | Apr. 11, 1944 |